United States Patent
Tryggvason

(10) Patent No.: US 6,501,203 B2
(45) Date of Patent: Dec. 31, 2002

(54) VIBRATION CONTROL APPARATUS

(75) Inventor: Bjarni V. Tryggvason, Houston, TX (US)

(73) Assignee: Canadian Space Agency, Saint-Hubert (CA)

(*) Notice: Subject to any disclaimer, the term of this patent is extended or adjusted under 35 U.S.C. 154(b) by 0 days.

(21) Appl. No.: 09/870,635

(22) Filed: Jun. 1, 2001

(65) Prior Publication Data

US 2002/0179385 A1 Dec. 5, 2002

(51) Int. Cl.[7] ................................................ H02K 7/09
(52) U.S. Cl. ................ 310/90.5; 248/550; 267/140.15; 335/285
(58) Field of Search ................. 267/140.15, 150, 267/140.5, 136; 244/158 R, 166; 248/550, 638; 310/90.5; 335/285, 306, 286, 287; 361/144, 142, 146; 188/266.1

(56) References Cited

U.S. PATENT DOCUMENTS

| | | | | |
|---|---|---|---|---|
| 3,369,770 A | * | 2/1968 | Cohlan | 244/1 R |
| 3,785,595 A | * | 1/1974 | Fischell | 244/166 |
| 4,408,740 A | * | 10/1983 | Kleber | 117/901 |
| 5,020,743 A | * | 6/1991 | von Bun et al. | 244/159 |
| 5,206,504 A | * | 4/1993 | Sridharan | 250/251 |
| 5,294,854 A | * | 3/1994 | Trumper | 310/181 |
| 5,300,843 A | * | 4/1994 | Lyons et al. | 310/90.5 |
| 5,334,965 A | * | 8/1994 | Dolgin | 335/216 |
| 5,419,528 A | * | 5/1995 | Carter et al. | 248/542 |
| 5,609,230 A | * | 3/1997 | Swinbanks | 188/267 |
| 5,638,303 A | * | 6/1997 | Edberg et al. | 248/638 |
| 5,693,990 A | * | 12/1997 | Miyazaki | 248/550 |
| 5,701,113 A | * | 12/1997 | Edberg | 310/90.5 |
| 5,793,598 A | * | 8/1998 | Watanabe et al. | 361/144 |
| 5,996,960 A | * | 12/1999 | Krajec | 248/638 |
| 6,322,060 B1 | * | 11/2001 | Mayama et al. | 188/378 |
| 6,384,500 B1 | * | 5/2002 | Chassoulier et al. | 310/103 |
| 6,402,118 B1 | * | 6/2002 | Nijsse et al. | 188/267 |
| 6,409,125 B1 | * | 6/2002 | Jorck | 244/171 |

* cited by examiner

Primary Examiner—Jack Lavinder
Assistant Examiner—Benjamin A Pezzlo
(74) Attorney, Agent, or Firm—George A. Seaby

(57) ABSTRACT

A vibration control apparatus designed specifically for use on space vehicles includes a stator for mounting in the vehicle, a lower flotor, magnetically levitated on the stator, an upper flotor nested in and magnetically levitated on the lower flotor, and position, orientation and motion sensors carried by the stator and flotors. When any changes in position, orientation or movement, i.e. vibration of apparatus is detected, magnetic force actuators are energized to compensate for such changes to keep a work platform on the upper flotor virtually vibration-free. Moreover, controlled and induced vibration of the work platform and an experiment carried thereby can be effected using the lower flotor as a reaction mass, i.e. without feedback to the vehicle.

5 Claims, 8 Drawing Sheets

VIBRATION CONTROL APPARATUS

BACKGROUND OF THE INVENTION

1. Field of the Invention

This invention relates to a vibration control apparatus, and in particular to a microgravity vibration control apparatus.

2. Discussion of the Prior Art

At low frequencies (<0.01 Hertz) space platforms such as the shuttle and the International Space Station (ISS) provide a unique, near ideal free-fall environment, which can be used to conduct material science, fluid physics and crystal growth experiments. Departure from ideal free fall due to atmospheric drag, rotational effects and gravity gradient are of the order of a micro-g ($10^{-6}$ g). However, above 0.01 Hz spacecraft vibrations are such that acceleration levels typically exceed $10^{-3}$ g. Experiments conducted on the space shuttle and on MIR have shown that these vibration levels can significantly affect results. Vibrations, which are sometimes referred to as g-jitter, are driven by on-board activities such as attitude control systems, thermal control systems, air conditioning systems, power generation systems, crew activity and the operation of the spacecraft resulting in vibration environments characterized by milli-g ($10^{-3}$ g) acceleration levels. On the space shuttle, vibration levels in the frequency band 0.01 Hz to 100 Hz are in the range of $10^{-3}$ g Root Mean Square (RMS), with peaks typically exceeding several milli-g. These are sufficient to cause significant disturbances to experiments that have fluid phases, which includes many material science experiments. The acceleration environment of the International Space Station will likewise not be as clean as originally hoped for, and the ISS will not meet the current vibratory requirements without the use of vibration isolation apparatuses of the type described herein.

In order to isolate fluid science experiments from spacecraft vibrations, the Canadian Space Agency (CSA) developed a so-called Microgravity Vibration Isolation Mount (MIM), which constitutes a first generation of the present invention. The MIM was operational for more than 3000 hours on the Mir space station between May 1996 and January 1998. A second generation MIM was flown on space shuttle mission STS-85 in August 1997.

The MIM includes two major components, namely a stator which is fixed to $10^{-3}$ the spacecraft and a flotor on which is mounted an experiment to be isolated. Positions sensing devices track the position and orientation of the flotor with respect to the stator, and accelerometers monitor stator and flotor accelerations. The position sensing devices and accelerometers are used in an active control loop including magnetic actuators for moving the flotor relative to the stator to compensate for even extremely small vibrations of the stator.

There is a large volume of patent literature relating to vibration isolation and damping systems. Examples of such literature include U.S. Pat. No. 2,788,457 (Griest); U.S. Pat. No. 3,088,062 (Hudimac); U.S. Pat. No. 4,088,042 (Desjardins); U.S. Pat. No. 4,314,623 (Kurokawa); U.S. Pat. No. 4,432,441 (Kurokawa); U.S. Pat. No. 4,585,282 (Bosley); U.S. Pat. No. 4,595,166 (Kurokawa); U.S. Pat. No. 4,874,998 (Hollis Jr.); U.S. Pat. No. 4,710,656 (Studer); U.S. Pat. No. 4,724,923 (Waterman); U.S. Pat. No. 4,848,525 (Jacot et al); U.S. Pat. No 4,874,998 (Hollis Jr.); U.S. Pat. No. 4,929,874 (Mizuno); U.S. Pat. No. 4,947,067 (Habermann et al); U.S. Pat. No. 5,022,628 (Johnson et al); U.S. Pat. No. 5,168,183 (Whitehead); U.S. Pat. No. 5,236, 186 (Weltin et al); U.S. Pat. No. 5,285,995 (Gonzalez et al); U.S. Pat. No. 5,368,271 (Kiunke et al); U.S. Pat. No. 5,385,217 (Watanabe et al); U.S. Pat. No. 5,392,881 (Cho et al); U.S. Pat. No. 5,400,196 (Moser et al); U.S. Pat. No. 5,427,347 (Swanson et al); U.S. Pat. No. 5,427,362 (Schilling et al); U.S. Pat. No. 5,445,249 (Aida et al); U.S. Pat. No. 5,446,519 (Makinouchi et al); U.S. Pat. No. 5,483,398 (Boutaghou); U.S. Pat. No. 5,542,506 (McMichael et al); U.S. Pat. No. 5,584,367 (Berdut); U.S. Pat. No. 5,609,230 (Swinbanks); U.S. Pat. No. 5,638,303 (Edberg et al); U.S. Pat. No. 5,645,260 (Falangas); U.S. Pat. No. 5,718,418 (Gugsch); U.S. Pat. No. 5,744,924 (Lee); U.S. Pat. No. 5,765,800 (Watanabe et al); U.S. Pat. No. 5,844,664 (Van Kimmenade et al); U.S. Pat. No. 5,876,012 (Haga et al); U.S. Pat. No. 5,925,956 (Ohzeki); U.S. Pat. No. 6,031,812 (Liou), and WO 99/17034 (Nusse et al) and WO 00/20775 (Ivers et al).

GENERAL DESCRIPTION OF THE INVENTION

Some fluid phase experiments require controlled and induced vibration of the experiment, with no reaction back to the space vehicle. While a system of the type described above, including a stator and flotor, provides vibration damping, such a system cannot be used to effect such controlled and induced vibration.

The object of the present invention is to meet the need defined above by providing a vibration control apparatus which can effect controlled and induced vibration of an experiment with no disturbance to the space station. Coincidentally, the apparatus of the present invention is inherently more efficient at damping vibration than a two-stage system.

Accordingly, the invention provides a vibration control apparatus comprising:

(a) stator means for mounting on a fixed surface;

(b) lower flotor means normally spaced apart from said stator means in nesting relationship thereto;

(c) an upper flotor means normally spaced apart from said lower flotor means in nesting relationship thereto;

(d) work platform means on said upper flotor means;

(e) position sensing means associated with said stator means, lower flotor means and upper flotor means for determining the position and orientation of said lower flotor means and said upper flotor means relative to said stator means;

(f) accelerometer means associated with said stator means, lower flotor means and upper flotor means for determining acceleration of said lower flotor means and upper flotor means with respect to inertial space; and (g) vertical and horizontal magnetic force actuator means associated with said stator means, lower flotor means and upper flotor means for imparting motion to said lower flotor means and to said upper flotor means to compensate for vibration of said stator means, whereby vibration of said work platform is minimized.

GENERAL DESCRIPTION OF THE DRAWINGS

The invention is described below in greater detail with reference to the accompanying drawings, which illustrate a preferred embodiment of the invention, and wherein.

For the sake of simplicity, various elements have been omitted from most figures of the drawings.

DESCRIPTION OF THE PREFERRED EMBODIMENT

Figure 1:
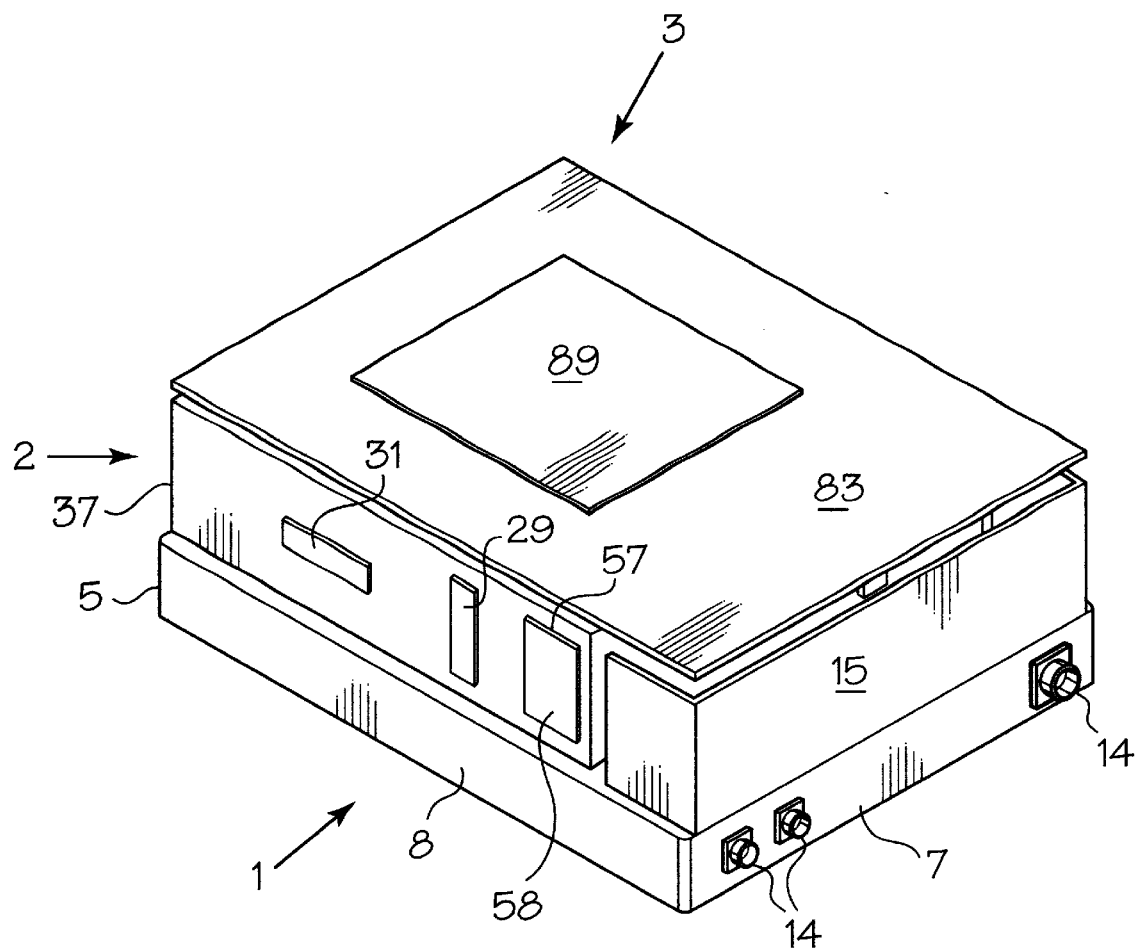
FIG. 1 is an isometric view of the apparatus of the present invention.
Figure 2:
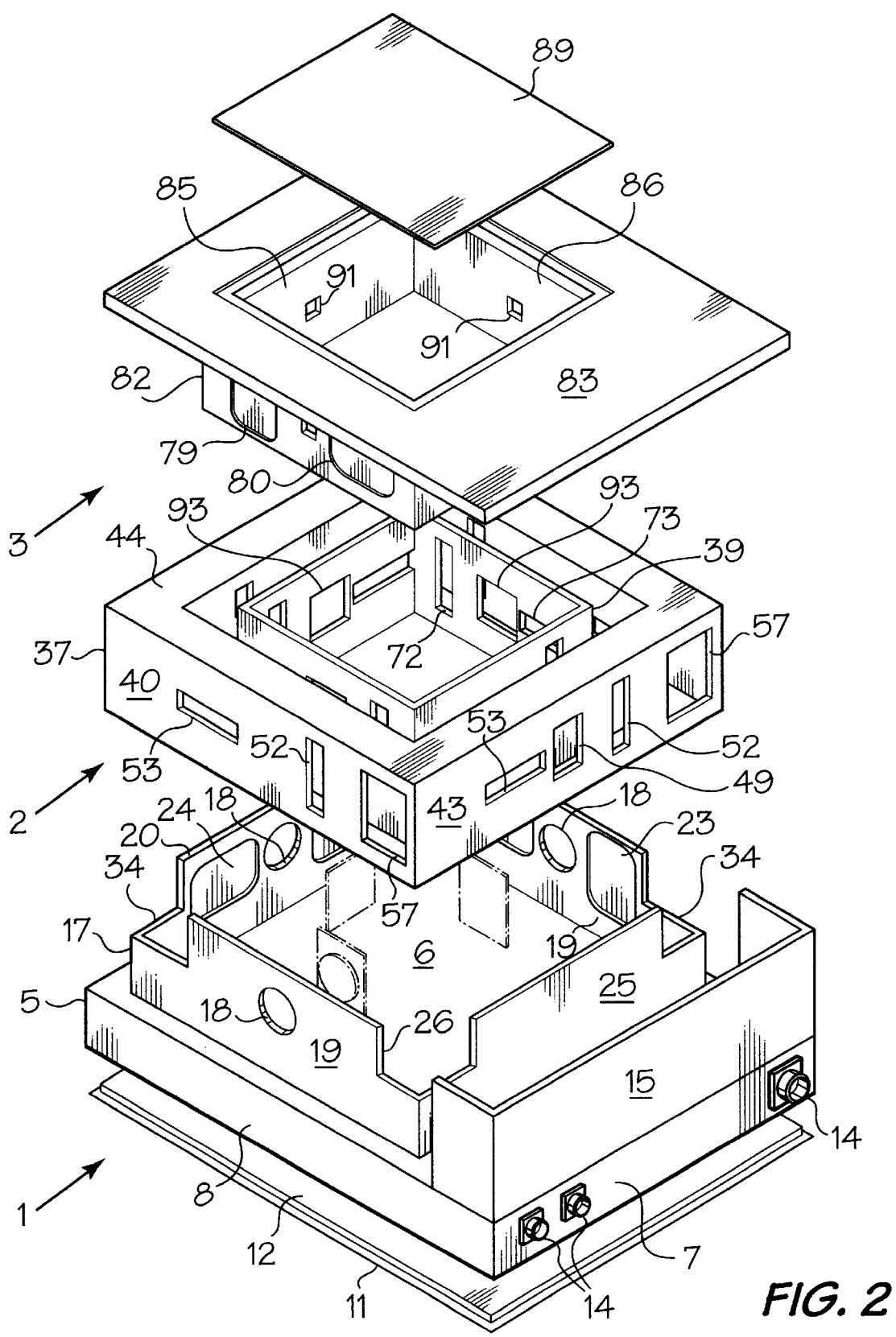
FIG. 2 is an exploded, isometric view of the apparatus of FIG. 1.

Referring to FIGS. 1 and 2, the basic elements of the apparatus include a bottom assembly or stator indicated generally at 1, a first, lower flotor indicated generally at 2 on the stator 1, and a second, upper flotor indicated generally at 3, all of which are formed of aluminum. As shown in FIG. 1, the stator 1 and the flotors 2 and 3 are nested together to form a generally rectangular parallelepipedic body.

Figure 3:
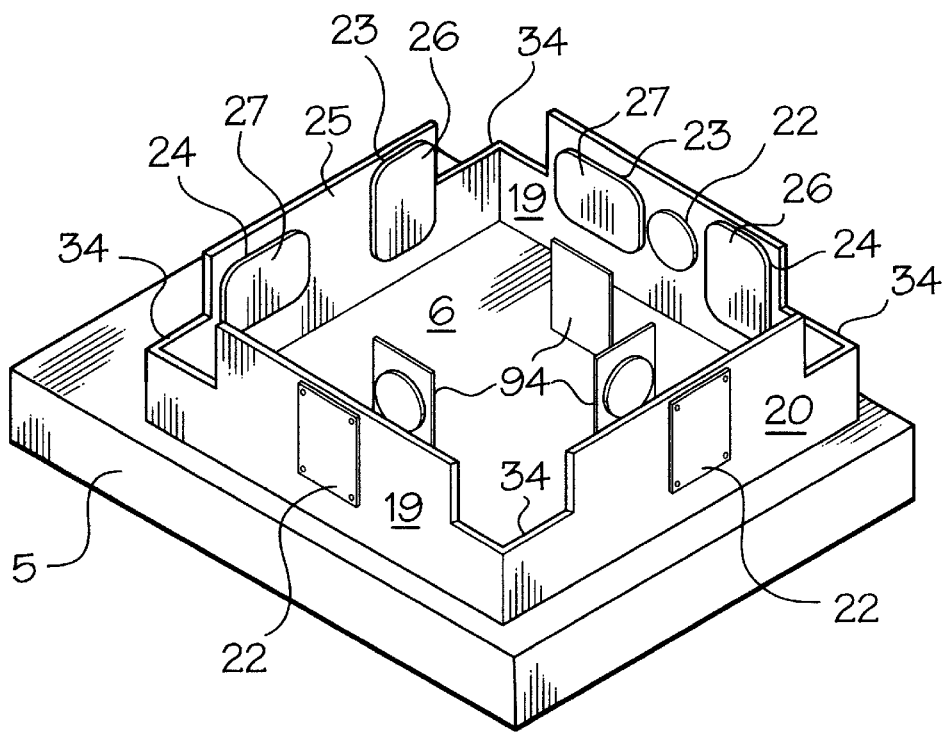
FIG. 3 is an isometric view of a stator used in the apparatus of FIGS. 1 and 2.

As best shown in FIGS. 2 and 3, the stator 1 includes a housing 5 defined by a top wall 6 on contiguous front wall 7, side walls 8 and a rear wall 10, and a removable baseplate 11 closing the bottom of the housing. The housing 5 carries a variety of elements including electronic control components. Connectors 14 and other elements (only a few shown) for coupling the apparatus to a source of power and a control system, neither of which are shown, are mounted in the front wall 7 and in a front cover plate 15 removably mounted on the top wall 6 of the housing 5.

A square fence 17 extends upwardly from the top wall 6 of the housing 5. Circular holes 18 in the centers of side walls 19 and rear end wall 20 of the fence receive position sensing detectors 22 (FIG. 3). Shallow, generally rectangular recesses 23 and 24 in the interior of the front wall 25, the side walls 19 and the rear wall 20 contain coils 26 and 27 (FIG. 3), which interact with opposed sets of vertical force magnets 29 and 30 (FIGS. 1, 2, 4, 6, 12 and 13), and with horizontal force magnets 31 and 32 in the lower flotor 2 (FIGS. 2 and 4 to 6). The coils 26 and 27, and the magnets 29 to 32 are described hereinafter in greater detail. Rectangular notches 34 are provided at the corners of the fence 17 for accommodating accelerometers 35 (FIG. 7) mounted in the lower flotor 2.

Figure 4:
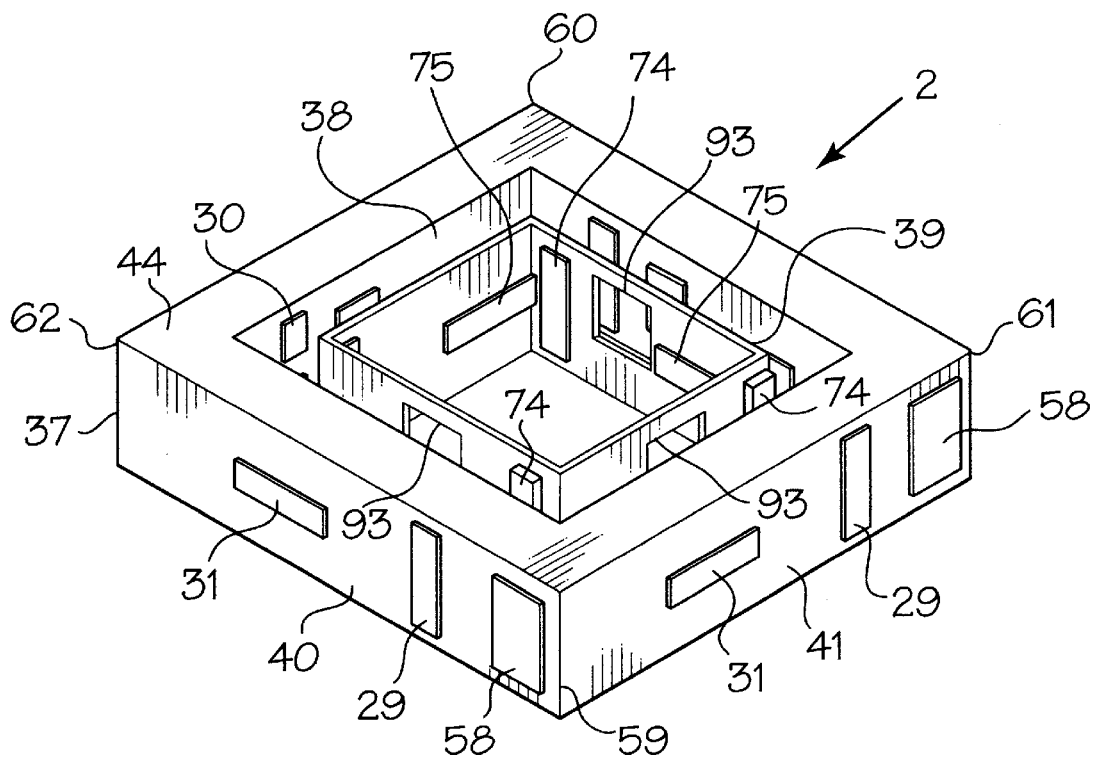
FIG. 4 is an isometric view from above and the rear of a lower flotor used in the apparatus of FIGS. 1 and 2.
Figure 5:
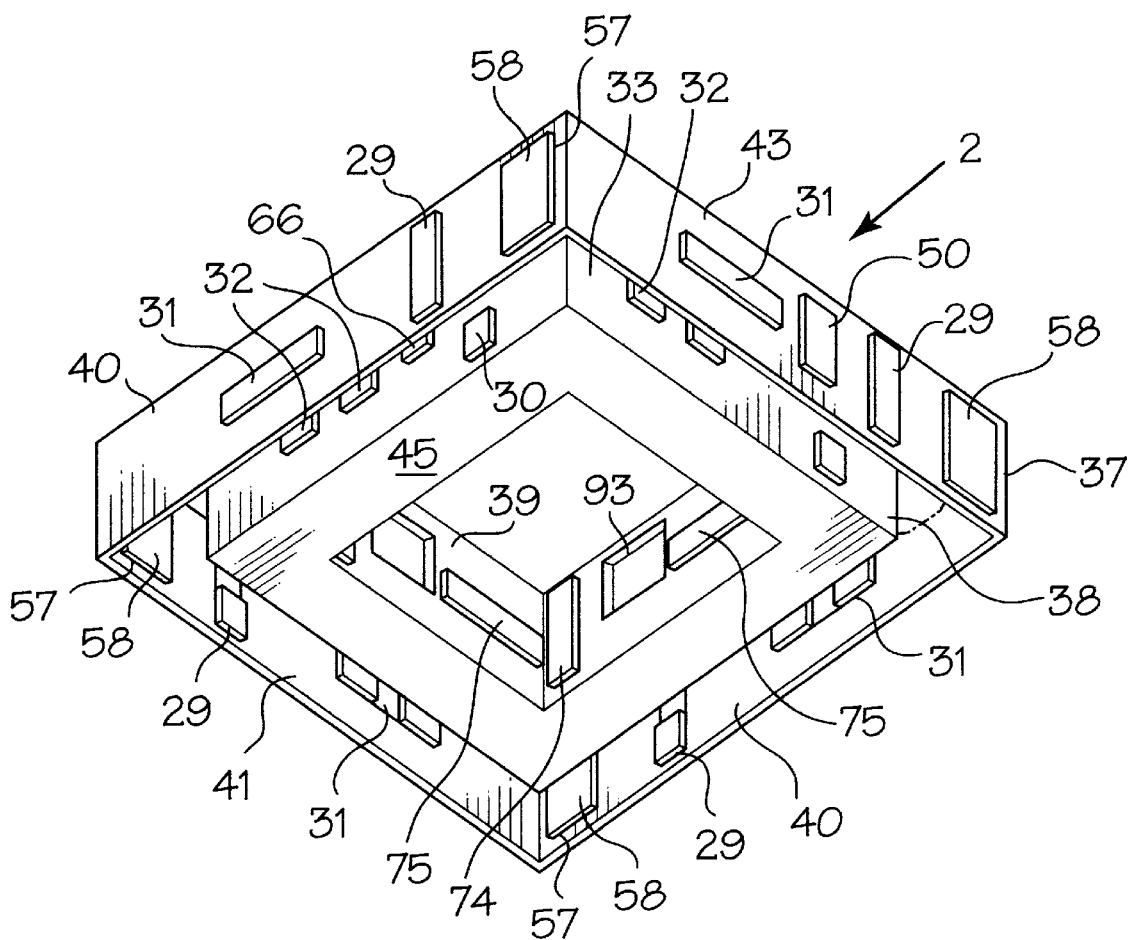
FIG. 5 is an isometric view from below and the front of the lower flotor of FIG. 4.
Figure 6:
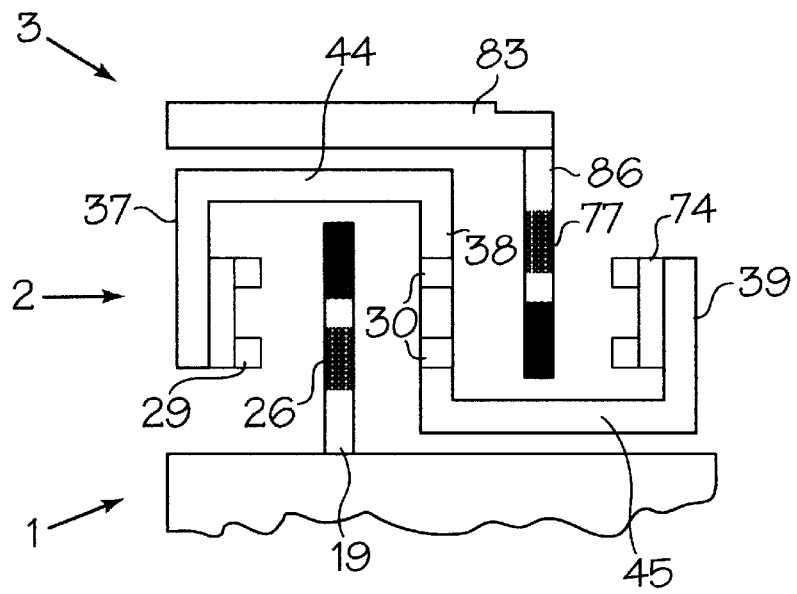
FIG. 6 is a schematic cross-section of one side of the apparatus of FIG. 1.

As best shown in FIGS. 4 to 7, the lower flotor 2 includes three parallel fences 37, 38 and 39 which are square when viewed from above and concentric with the stator fence 17. The side walls 40 and the rear wall 41 of the outer fence 37 are vertically aligned with the sides and rear end of the stator top wall 6. A gap between the front wall 43 of the flotor outer fence 37 and the stator cover plate 15 receives umbilical cords (not shown) extending between the flotors 2 and 3, and the stator 1. The umbilical cords carry electrical power and data and control signals between the stator 1 and the flotors 2 and 3. They can also include video lines for servicing hardware on the upper flotor 3. The top ends of the outer and intermediate fences 37 and 38 are interconnected by a top wall 44, and the bottom ends of the intermediate and inner fences 38 and 39 are interconnected by a bottom wall 45. Thus, as best shown in FIG. 6, the four sides of the lower flotor are crenellated in cross section, defining a pair of square pockets for receiving the stator 1 and the upper flotor 3.

A plurality of rectangular openings are provided in the side walls 40 and end walls 41 and 43 of the flotor outer fence 37. A central hole 49 in the front wall 43 of the outer fence 37 receives a voltage reference module 50 (FIG. 5). Two rectangular holes 52 and 53 in each wall of the outer fence 37 receive the vertical force magnets 29 and horizontal force magnets 31, respectively, which are mentioned above.

Figure 8:
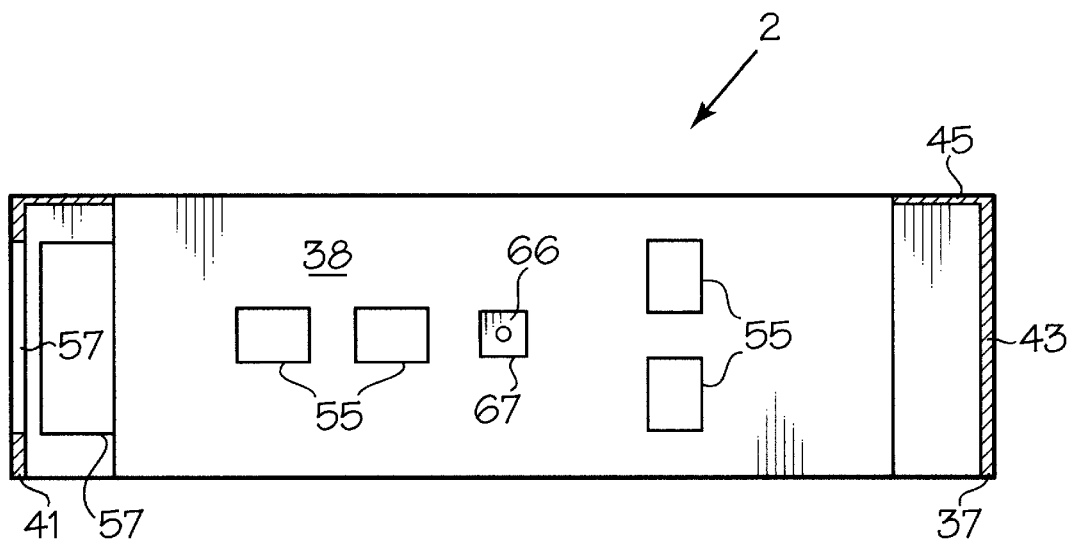
FIG. 8 is a cross section taken generally along line 8—8 of FIG. 7.

Two pairs of holes 55 in each wall of the intermediate fence 38 (FIG. 8) receive the magnets 30 and 32. As will be appreciated from FIGS. 6 and 8, the magnets 29 to 32 in combination with the coils 26 and 27 define Lorentz force actuators for magnetically levitating the lower flotor 2 with respect to the stator 1 which is fixed to a space platform. The eight actuator coils in the stator fence 17 react with the eight magnet assemblies in the outer fence 37 of the lower flotor 2. It will be noted that the horizontal and vertical force actuators are the same except that the two magnet and coil combinations in each fence are at 90° to each other, i.e. one magnet and coil combination generates a vertical force, and the other combination generates a horizontal force vector. Differential actuator forces can be used to generate torque for controlling rotation about all axes.

A set of holes 57 near the corners of the fence 37 receive signal conditioning modules 58 (FIGS. 1 and 4) which are connected to the accelerometers 35. The modules 58 condition data signals from the accelerometers 35 to the control system (not shown) for the apparatus.

Figure 7:
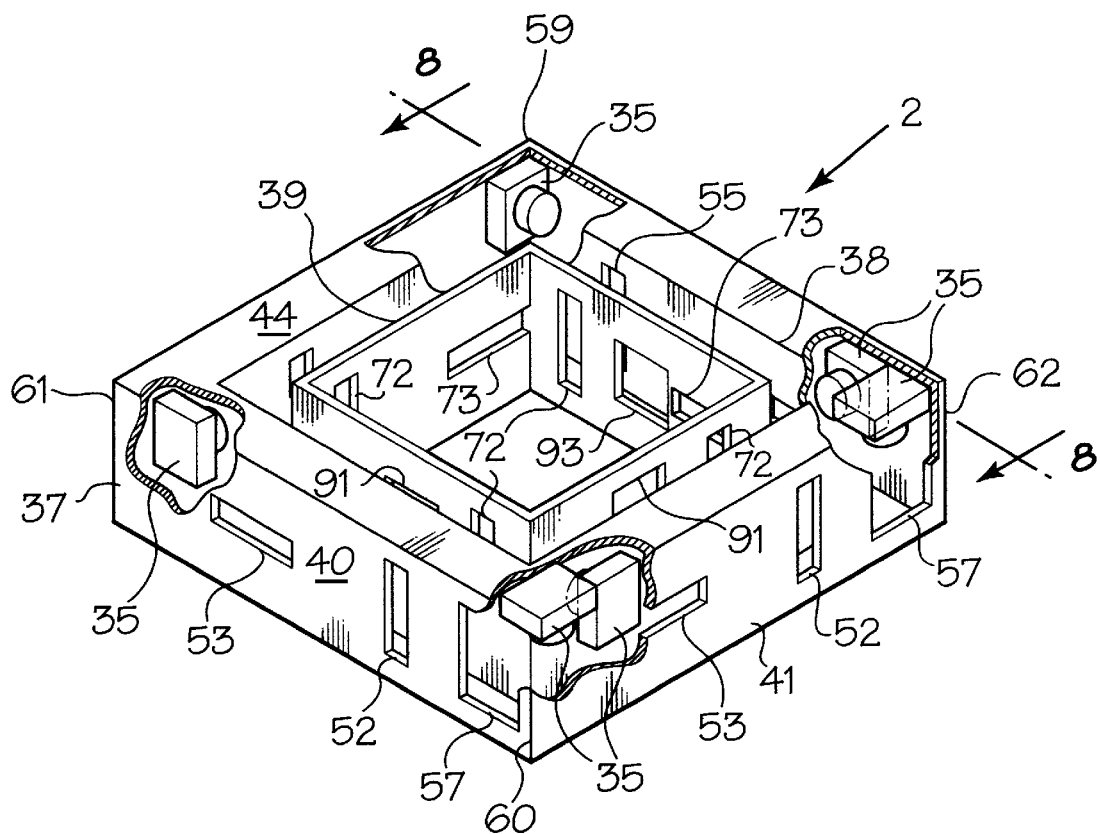
FIG. 7 is a partly sectioned, isometric view of the lower flotor of FIGS. 4 and 5.
Figure 9:
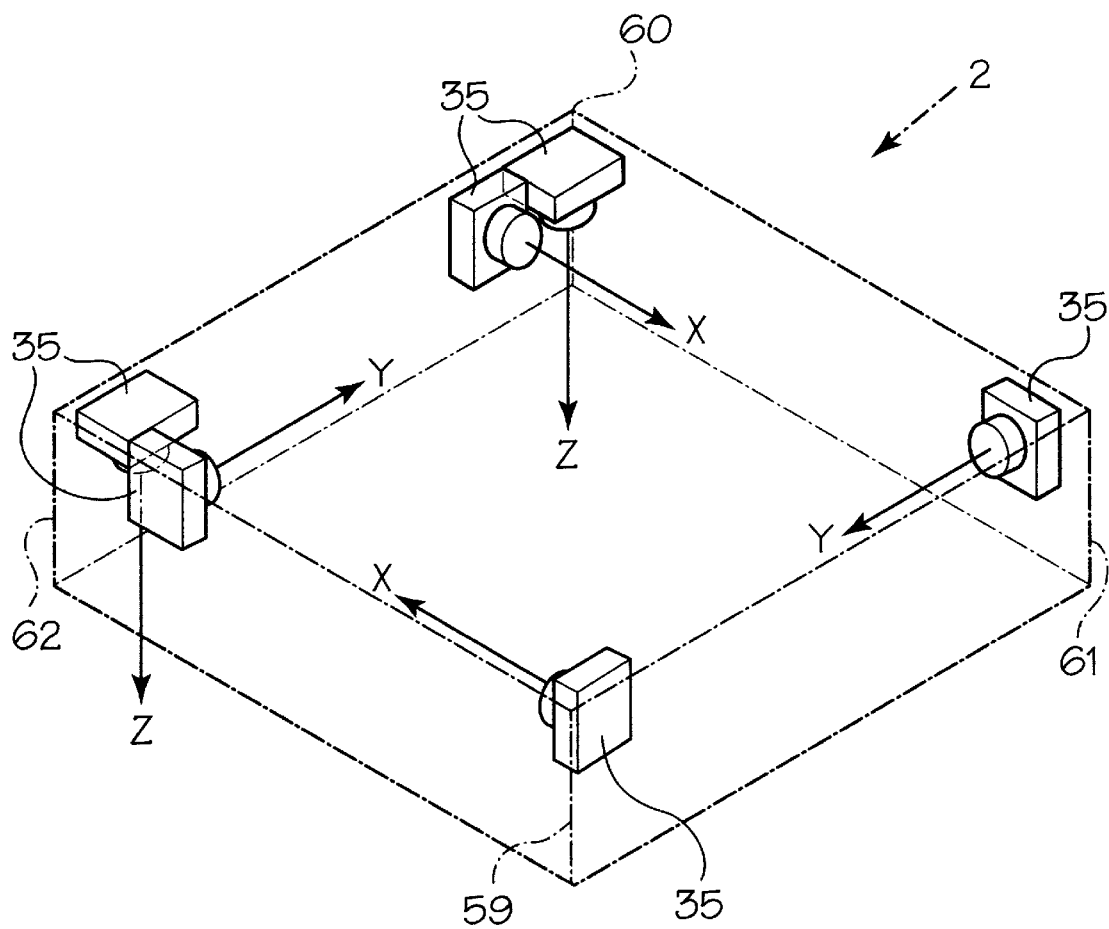
FIG. 9 is a schematic, isometric view of the lower flotor of FIGS. 4, 5 and 7 showing accelerometers used in the flotor.

Suitable accelerometers 35 are sold by Honeywell Inc., Minneapolis, Minn., U.S.A. under the trade-mark Q-Flex, specifically Q-Flex QA-3000 accelerometers, which develop an acceleration-proportional output current providing both static and dynamic acceleration measurement. As best shown in FIGS. 7 and 9 there are two accelerometers 35 in each of the corners 59 and 60, and one in each of the corners 61 and 62 of the lower flotor 2. Three additional accelerometers in the stator housing 5 act as references for the accelerometers 35 and to three accelerometers 64 (FIG. 11) on the upper flotor 3.

Referring to FIG. 9, the accelerometers 35 detect translation and rotation of the flotor 2 about the X,Y and Z axis or vertically, longitudinally and transversely with respect to the stator 1 as indicated by arrows X, Y and Z. Similarly, the accelerometers 64 detect translation and rotation of the flotor 3 about the X, Y and Z axes with respect to the stator 1. Thus, the accelerometers determine acceleration of the flotors 2 and 3 with respect to inertial space.

The position sensing detectors (PSDs) 22 mounted in the centers of the side and rear walls 19 and 20, respectively of the stator fence 17 receive light from collimated light emitting diodes (LEDs) 66 mounted in square, central holes 67 (one shown—FIG. 8) in the side walls and the rear end wall of the intermediate fence 38 of the lower flotor 2. The PSDs 22 are duo-lateral diodes manufactured by VDT Sensors, Inc., Hawthorne, Calif., U.S.A. which determine the position of the lower flotor 2 with respect to the stator 1 in six degrees of freedom. Suitable LEDs bearing Model No. L2791-02 are available from Hamamatsu Systems Canada Inc., Montreal, Quebec, Canada. These LEDs have a narrow emission angle of ±2° to minimize the size of the light spot on the PSD.

All four sides of the lower flotor inner fence 39 contain rectangular openings 72 and 73 (FIGS. 2 and 7) for receiving vertical force magnets 74 and horizontal force magnets 75 (FIGS. 4 to 6). The magnets 74 and 75 are aligned with coils 77 and 78 mounted in recesses 79 and 80 in a fence 82 defining part of the upper flotor 3. The magnets 74 and 30, and the coils 77 also define vertical Lorentz force actuators for magnetically levitating the upper flotor 3 in the lower flotor 2, and the magnets 75 and 32, and the coils 78 define horizontal force actuators.

Figure 10:
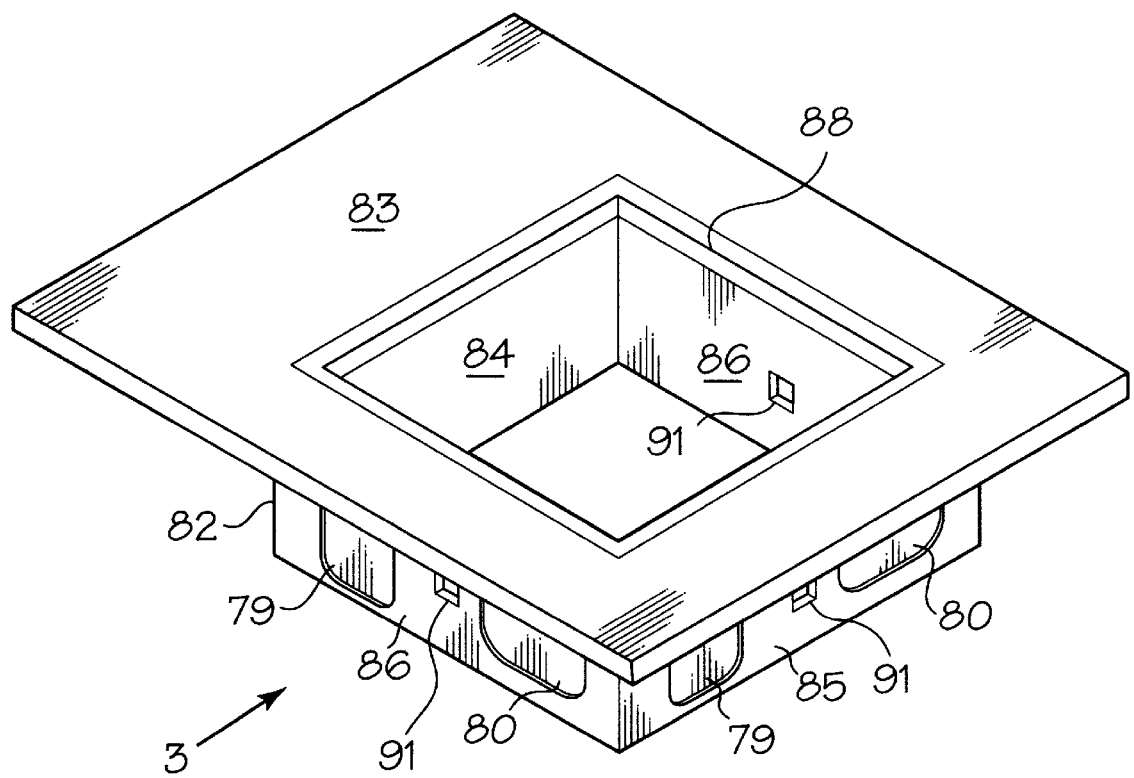
FIGS. 10 and 11 are isometric views of an upper flotor used in the apparatus of FIGS. 1 and 2.
Figure 11:
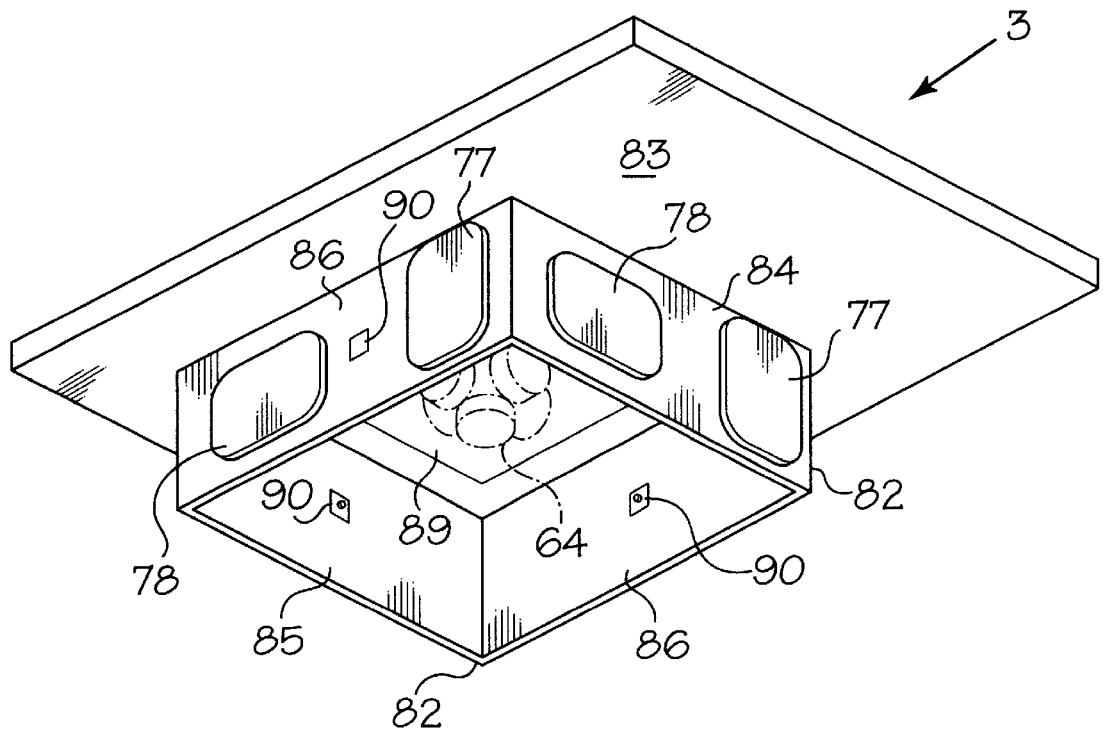

Referring to FIGS. 1, 10 and 11, the upper flotor 3 includes a top plate 83 which defines a work platform, and the fence 82 formed by contiguous front wall 84, rear wall 85 and side walls 86. An opening 88 in the top plate 83, providing access to the interior of the flotor 3 and the top of the stator 1 is normally closed by a cover plate 89 (FIGS. 1, 2 and 6). The cover plate 89 carries the three accelerometers 64.

LEDs 90 (FIGS. 11 and 12) are mounted in square central openings 91 (FIGS. 2 and 10) in the rear and side walls 85 and 86, respectively of the upper flotor fence 82. Light from the LEDs is directed inwardly through central holes 93 in the inner fence 39 of the lower flotor 2 to PSDs 94 (FIG. 3) mounted on the top wall 6 of the stator housing 5.

Figure 12:
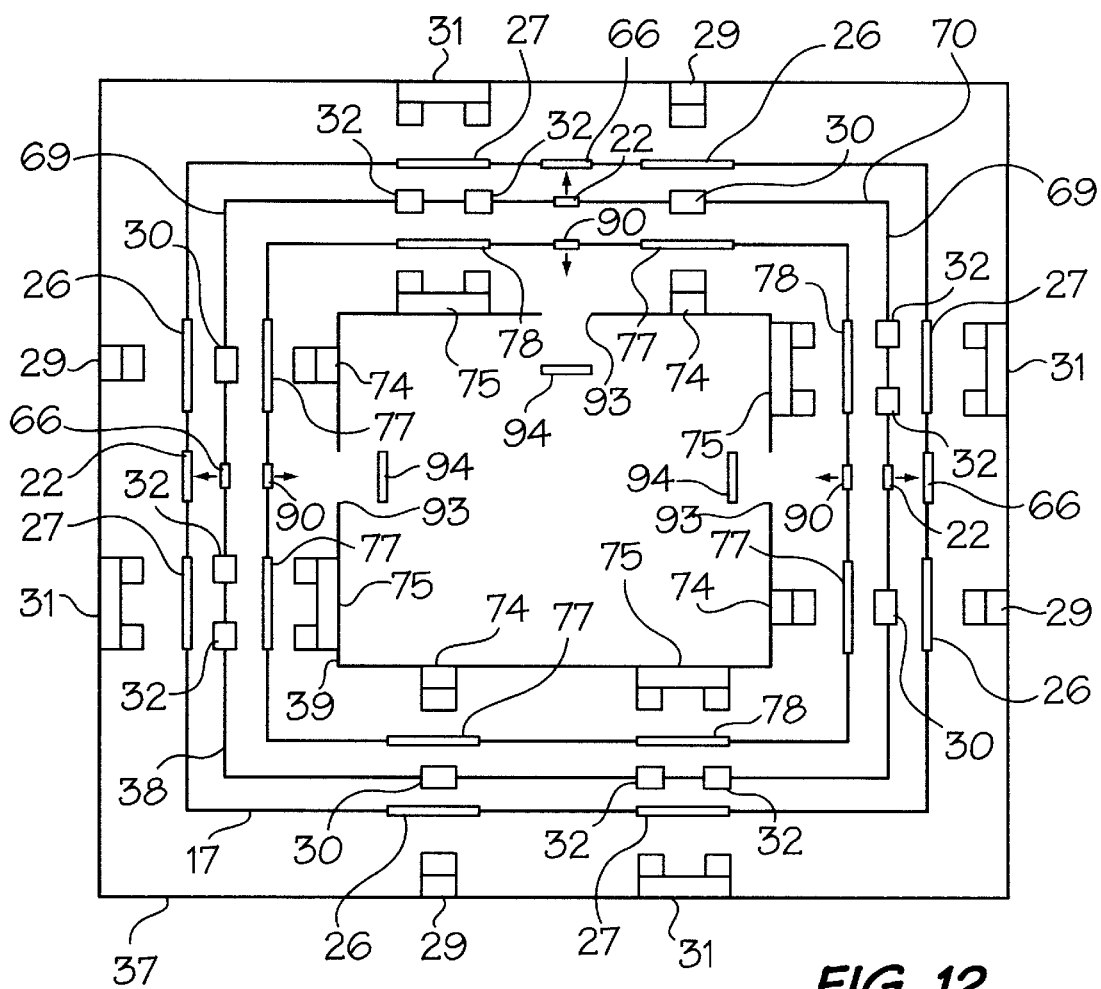
FIG. 12 is a schematic cross section of the apparatus of FIG. 1.
Figure 13:
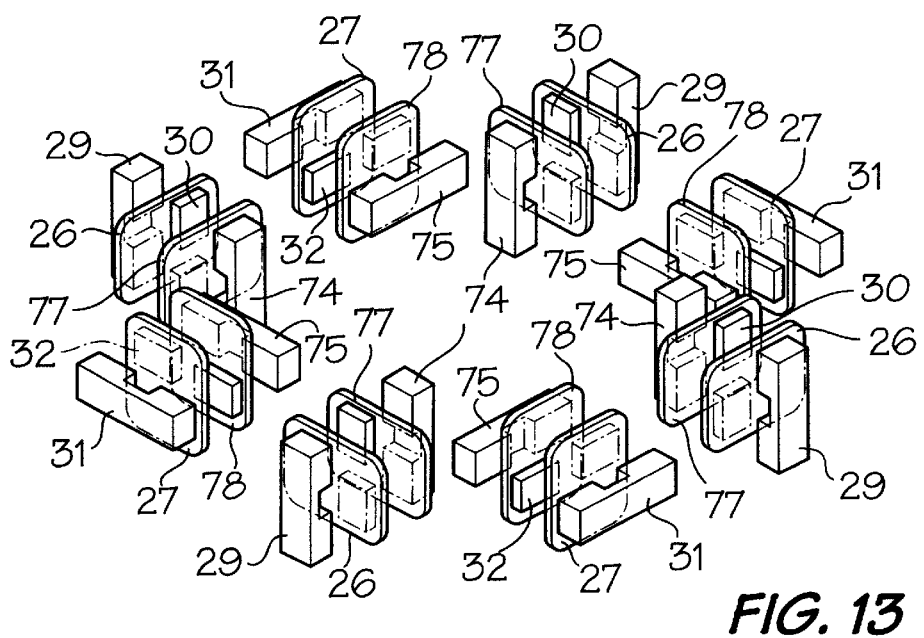
FIG. 13 is a schematic, isometric view of coils and magnets used in the apparatus of FIGS. 1 and 2.

Referring to FIGS. 12 and 13, in operation the LEDs 66 and 90 in combination with the PSDs 22 and 94, and the accelerometers 35 and 64 (FIGS. 9 and 11) provide data signals indicative of the positions, orientation and movement of the flotors 2 and 3 relative to the stator 1. The signals are processed using an on-board computer (not shown) which generates control signals which are fed to the appropriate force actuators defined by the combinations of magnets and coils in the stator 1, and the lower and upper flotors 2 and 3. Vertical force is imparted to the lower flotor 2 using coils 26 in combination with magnets 29 and 30, and horizontal force is imparted to the flotor 2 using coils 27 in combination with magnets 31 and 32. By feeding current to the coils 77, magnetic lines of force are generated in magnets 74 and 30 to move the flotor 3 relative to the flotor 1. Horizontal movement of the flotor 3 is effected using coils 78 in combination with the magnets 75 and 32.

Thus, various combination of coils and magnets can be used to magnetically levitate the flotor 2 with respect to the stator 1 and the upper flotor 3 in the lower flotor 2 compensating for even very minute vibrations in the vehicle carrying the apparatus. The work platform defined by the top plate 83 and the cover plate 89 of the flotor 3 is maintained virtually vibration-free, the apparatus correcting for horizontal and vertical movement of stator 1, and any roll, pitch or yaw. Moreover, the coil and magnet combinations can be used to induce controlled vibration of the upper flotor 3, the work platform and an experiment thereon, using the lower flotor as a reaction mass. The controlled vibration is isolated from the vehicle, i.e. there is no vibration of the vehicle as a result of vibration of the experiment

I claim:

1. A vibration control apparatus comprising:
   (a) stator means for mounting on a fixed surface;
   (b) lower flotor means normally spaced apart from said stator means in nesting relationship thereto;
   (c) an upper flotor means normally spaced apart from said lower flotor means in nesting relationship thereto;
   (d) overlapping fence means on said stator means and on said lower and upper flotor means;
   (e) work platform means on said upper flotor means;
   (f) position sensing means associated with said stator means, lower flotor means and upper flotor means for determining the position and orientation of said lower flotor means and said upper flotor means relative to said stator means;
   (g) accelerometer means associated with said stator means, lower flotor means and upper flotor means for determining acceleration of said lower flotor means and upper flotor means with respect to inertial space; and
   (h) vertical and horizontal magnetic force actuator means associated with said stator means, lower flotor means and upper flotor means for imparting motion to said lower flotor means and to said upper flotor means to compensate for vibration of said stator means, whereby vibration of said work platform is minimized, said force actuator means including:
      (i) coil means on said stator means and on said upper flotor means; and
      (ii) magnet means on said lower flotor means aligned with said coil means for interacting with said coil means to magnetically levitate the lower and upper flotors with respect to said stator means.

2. The vibration control apparatus of claim 1, wherein said position sensing means includes light emitting diodes on said lower and upper stator means for emitting collimated horizontal beams of light longitudinally and transversely of the apparatus; and position sensing detectors on said stator means for receiving light from said light emitting diodes to provide an indication of the position and orientation of the lower and upper flotor means relative to said stator means.

3. The vibration control apparatus of claim 2, wherein said accelerometer means includes:
   (i) first accelerometers on said lower flotor means for detecting vertical and horizontal movement and rotational acceleration of said lower flotor means relative to inertial space; and
   (ii) second accelerometer means on said upper flotor means for detecting vertical and horizontal movement of said upper flotor means relative to inertial space.

4. The vibration control apparatus of claim 1, wherein said fence means includes:
   (i) a first square fence extending upwardly from said stator means;
   (ii) a second square fence on said lower flotor means overlapping said first fence; and
   (iii) a third square fence nested in said second fence on said lower flotor means.

5. The vibration control apparatus of claim 4, wherein said second fence defines a hollow square, the sides of the square having a crenellated cross section defining pockets for receiving said first and third square fences.

* * * * *